Patented Feb. 2, 1943

2,310,150

UNITED STATES PATENT OFFICE 2,310,150

DERIVATIVES OF THE CYCLOPENTANO-POLYHYDROPHENANTHRENE SERIES AND PROCESS OF MAKING SAME

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application February 19, 1940, Serial No. 319,806. In Switzerland July 12, 1937

7 Claims. (Cl. 260—397.4)

This is a continuation-in-part of our application Serial No. 215,867, filed June 25, 1938.

According to the present invention derivatives of the saturated and unsaturated cyclopentano-polyhydrophenanthrene series can be made by causing an aldehyde of this series to react with an aliphatic diazo compound and if required treating the reaction product so as to split the ethylene oxide compound which may be formed beside or instead of the ketone.

As parent materials for the invention there come into consideration aldehydes of the cyclopentano-polyhydrophenanthrene series, for example aldehydes derived from aetio-cholane, pregnane, oestrane or hydro-oestrane and their stereo-isomers, homologues and partial dehydrogenation products. They may contain any other desired substituents, for example substituted or unsubstituted hydroxyl, carbinol, amino, carboxyl or hydrocarbon groups, or halogen atoms or keto-groups or their enol derivatives. Naturally such substituents may also react in some cases with the aliphatic diazo compounds so that in addition to the reaction with the aldehyde group the introduction of further substituted or unsubstituted hydrocarbon residues may take place. The parent materials may be saturated compounds or they may contain one or more unsaturated linkages. Thus the process may start for example from saturated and unsaturated 3-oxy-aetio-allo-cholane-17-aldehydes, 3-keto-aetio-allo-cholane-17-aldehydes or their enol derivatives, aetio-cholane-17-one-3-aldehydes, 3-carboxy-aetio-cholane-17-aldehydes, 3-keto-11-oxy-aetio-cholane-17-acetaldehydes, 3-oxy-, 3-keto- or 3-halogen-bisnor-cholane-aldehydes, oxy- or keto-nor-cholane-aldehydes or -cholane-aldehydes, and analogous compounds of the oestrane or hydro-oestrane series or derivatives or stereo-isomers of any of these, especially the compounds which differ from the foregoing aldehydes in the configuration at the carbon atoms 3, 5, 9, 11 and/or 17.

Among aliphatic diazo compounds there are included quite generally diazomethane and its mono- and di-substitution products particularly with any desired radicals containing carbon, for example mono- and di-alkyl-, cyclo-alkyl-, aralkyl- and aryl-diazo-compounds such as diazoethane, diazobutane, further diazo-propylene, phenyldiazo-methane, diazoketones such as diazo-acetone, diazo-acetophenone, diazo-benzoyl-acetone, furthermore salts of diazomethane-di-sulfonic acids, diazo-camphor, diazo-mono- and -dicarboxylic acid derivatives, such as diazo-acetic acid esters, amides or nitriles or their substitution products, especially with alkyl- cyclo-alkyl-, aralkyl- and aryl radicals, diazomalonic acid-, diazosuccinic acid-, diazobenzoylmethane carboxylic acid-esters, -amides, -nitriles and the like. In the latter cases the saponification of the substituted carboxyl groups and an elimination of the carboxyl groups may follow the reaction with the aldehyde group.

It may be left undecided whether in the course of the reaction intermediate products of the furodiazole type of little stability are formed. In any case there are obtained with elimination of nitrogen ketones of the formula

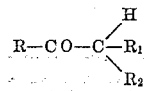

in which R represents a radical containing the cyclopentano-polyhydrophenanthrene ring structure and substituted as may be desired, $R_1$ and $R_2$ represent for example hydrogen, radicals containing carbon such as substituted and unsubstituted hydrocarbon radicals, substituted carboxyl groups, sulfonic acid groups or acyl groups. These ketones may be isolated and purified for example by recrystallization, sublimation in a vacuum, selective adsorption or in many cases by way of their condensation products with ketone reagents such as semicarbazide or trimethylammonium acetic acid hydrazide, or by a combination of any of these methods. They are compounds of therapeutic value or can be converted into such compounds.

Ethylene oxide derivatives of the formula

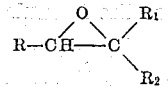

(in which R, $R_1$ and $R_2$ have the meanings above indicated) may be formed as by-products. These compounds are likewise valuable products since they can easily be split according to known methods (see, for example Richter-Anschütz, Chemie der Kohlenstoffverbindungen, 12th edition, vol. I, page 403) to produce for example glycols or derivatives thereof such as halogenhydrins, α-amino-alcohols, glycol-mono-esters or ethers and glycol di-esters, or then alcohols, ketones, α-oxy-nitriles and the like. They can be isolated by physical methods similar to those available for isolating the ketones and frequently advantageously from the non-ketonic fraction, or by chemical methods, for example after splitting the ethylene oxide bridge by esterification for example with chlorosulfonic acid or phthalic acid.

The following examples illustrate the invention, the parts being by weight:

Example 1

1 part of Δ⁵-aetio-cholene-3-ol-17-aldehyde (obtained by reducing Δ⁵-21-acetoxy-pregnene-3-ol-20-one with aluminium isopropylate, hydrolysing and splitting the glycolic group with periodic acid) is dissolved in ether and the solution is mixed with an ethereal solution of diazomethane prepared from 3 parts of nitrosomethylurethane. After the solution has been allowed to stand for several days the solvent is evaporated and the residue is heated with a solution of the chloride of trimethylamino-acetic acid hydrazide in alcohol and acetic acid. The latter solution is poured into water and the resulting acid solution is at once neutralized with alkali solution and extracted with ether. The ketone condensation product dissolved in the aqueous layer is saponified by cautious addition of sulfuric acid and after standing for some time the solution is extracted with ether. The washed ethereal solution yields on evaporation Δ⁵-pregnene-3-ol-20-one of the formula

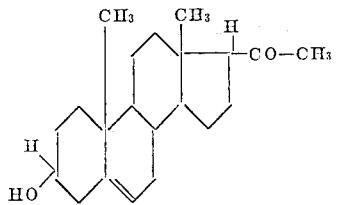

having the melting point 193° C.

Example 2

An ethereal solution of 3 parts of Δ⁴-aetio-cholene-3-one-17-aldehyde (obtainable by reducing Δ⁵-21-acetoxy-pregnene-3-ol-20-one with aluminium isopropylate, hydrolysing, condensation of the glycolic group with acetone, dehydration of the 3-hydroxyl group by means of an aluminium alcoholate in the presence of a ketone, splitting off the acetone and treating the free glycol with periodic acid) is mixed with an ethereal solution of diazomethane prepared from 5 parts of nitroso-methylurethane and the whole is allowed to stand for several days. The ether is then evaporated and the residue is sublimed at 115° C. in a high vacuum (0.0005 millimetre). The sublimate is recrystallized from hexane or from ethyl acetate whereby there is obtained Δ⁴-pregnene-3:20-dione-(progesterone) of the formula

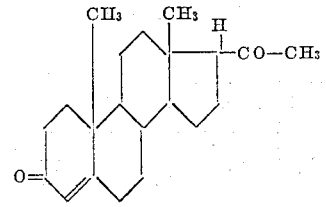

It crystallizes in dimorphous forms melting respectively at 120° C. and 129° C.

If an enol derivative, for example an enol ester or enol ether of the 3-keto-17-aldehyde is used instead of the 3-keto-17-aldehyde itself there is obtained the corresponding 3-enol derivative of progesterone.

Example 3

300 mgr. of Δ⁴-aetio-cholene-3-one-17-aldehyde is dissolved in 30 c. c. of ether, and a solution of 200 mgr. of diazomalonic acid ethyl ester in 20 c. c. of ether is added. When the reaction is complete, the solution is washed with water and soda solution and is then evaporated to dryness in vacuo. The residue is hydrolyzed by boiling with 10 c. c. of methyl alcoholic potassium hydroxide solution of 5 per cent strength for 2 hours under reflux. To the solution, which now contains the potassium salt, 8 c. c. of sulfuric acid of 2N strength are added, and the whole is boiled under reflux for a further 2 hours. It is now poured into water, extracted with ether, and the ethereal solution, after washing and drying, is evaporated. The resulting yellowish crystalline mass is sublimed in a high vacuum at 120° C. and the sublimate is recrystallized from hexane, whereby the progesterone described in Example 2 is obtained.

Instead of diazomalonic ester, a diazoacetic ester may also be used.

If Δ⁵-aetio-cholene-3-ole-17-aldehyde is used in place of Δ⁴-aetio-cholene-3-one-17-aldehyde as parent substance, the Δ⁵-pregnenole-(3)-one-(20) described in Example 1 is obtained.

Example 4

To 200 mgr. of Δ⁵-aetio-cholene-3-ol-17-aldehyde, dissolved in 20 c. c. ether there are added 150 mgr. of 2-diazo-propane in 15 c. c. ether. After standing for several days, the ethereal solution is washed with water and sodium carbonate solution, dried and evaporated. The residue is purified in known manner by chromatographic analysis and the Δ⁵-21-dimethyl-pregnene-3-ol-20-one of the formula

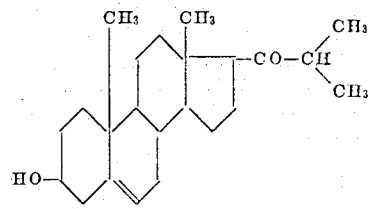

is recrystallized from petroleum-ether.

In an analogous manner other saturated and unsaturated compounds of the cyclopentanopolyhydrophenanthrene series with the group

can be obtained, R₁ and R₂ being monovalent radicals containing carbon, for example alkyl, cycloalkyl, aralkyl and aryl groups, substituted carboxyl groups, cyanogen groups etc.

Example 5

500 mgr. of Δ⁵-aetio-cholene-3-ole-17-aldehyde are dissolved in 50 c. c of absolute ether and a solution of 250 mgr. of diazoethane in 30 c. c. of ether is added. When the reaction is complete, the reaction solution is washed with water, sodium carbonate solution and again with water, after which it is dried and evaporated in vacuo. The residue is sublimed at 140°/0.01 mm. and recrystallized from dilute acetone, when the Δ⁵-21-methyl-pregnene-3-ole-20-one is obtained in the form of colourless needles of M. P. 170–171° C. It has the formula

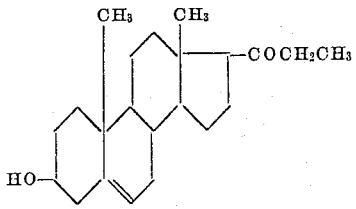

and yields a monoacetate of M. P. 176–177° C.

If diazopropane is used in place of diazoethane in the reaction, the Δ⁵-21-ethyl-pregnen-3-ole-20-one, M. P. 125–126° C., or its acetate, M. P. 114–115° C., is obtained.

If the Δ⁴-aetio-cholene-3-one-17-aldehyde is used as parent substance in place of Δ⁵-aetiocholene-3-ole-17-aldehyde, the 21-methyl-progesterone, M. P. 151–152° C., of the formula

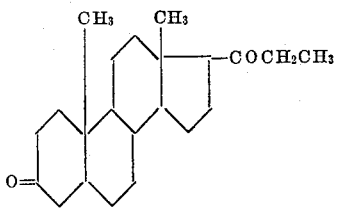

is obtained with diazoethane in a fully analogous manner. By peroral administration in the corpus-luteum test it proves to be active, in contrast to progesterone.

By starting from aldehydes of the pregnane series for example the Δ⁴:¹⁷-pregnadiene-3-one-21-al, there are obtained analogously the corresponding 21-ketones.

What we claim is:

1. A process for the manufacture of derivatives of the cyclopentano-polyhydrophenanthrene series, comprising causing an aldehyde of this series to react with an aliphatic diazo compound.

2. A process for the manufacture of derivatives of the cyclopentano-polyhydrophenanthrene series, comprising causing an aldehyde of this series to react with an aliphatic diazo compound and treating the reaction product so as to split the ethylene oxide compound formed.

3. A process for the manufacture of derivatives of the cyclopentano-polyhydrophenanthrene series, comprising causing an aldehyde of this series to react with aliphatic diazo-carboxylic acid derivatives selected from the group consisting of diazo-acetic acid esters, diazoacetic acid amides, diazo-acetic acid nitriles and their alkyl-, cycloalkyl-, aralkyl- and aryl-substituted products, diazomalonic acid esters, diazomalonic acid amides and diazomalonic acid nitriles.

4. A process for the manufacture of derivatives of the cyclopentano-polyhydrophenanthrene series, comprising causing an aldehyde of this series to react with aliphatic diazo-carboxylic acid derivatives selected from the group consisting of diazo-acetic acid esters, diazo-acetic acid amides, diazo-acetic acid nitriles and their alkyl-, cycloalkyl-, aralkyl- and aryl-substituted products, diazomalonic acid esters, diazomalonic acid amides and diazomalonic acid nitriles and hydrolyzing and decarboxylating the reaction product.

5. The compounds of the cyclopentano-polyhydrophenanthrene series containing at the 17-position of the nucleus the grouping

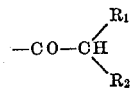

in which $R_1$ and $R_2$ each represents alkyl.

6. The compounds of the cyclopentano-polyhydrophenanthrene series containing at the 17-position of the nucleus the grouping

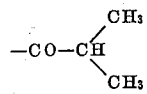

7. The compound of the formula

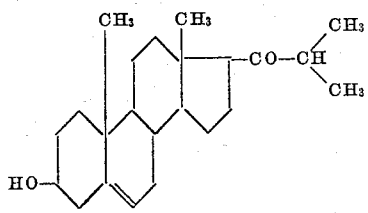

KARL MIESCHER.
ALBERT WETTSTEIN.